(12) United States Patent
Kapila et al.

(10) Patent No.: US 6,337,413 B1
(45) Date of Patent: Jan. 8, 2002

(54) FATTY ACID ESTERS TO DISSOLVE POLYSTYRENE FOR PRODUCTION OF COMMODITY MATERIAL USEFUL FOR PRODUCTION OF POLYMERS

(76) Inventors: Shubhen Kapila, 10576 Green Leaf Dr.; Virgil J. Flanigan, 11320 Road 2140; Michael F. Maples, 403 E. 10th St., all of Rolla, MO (US) 65401; Michael W. Mills, 200 Collins Ct., Ashland, MO (US) 65010

( * ) Notice: Subject to any disclaimer, the term of this patent is extended or adjusted under 35 U.S.C. 154(b) by 0 days.

(21) Appl. No.: 09/668,880
(22) Filed: Sep. 25, 2000
(51) Int. Cl.$^7$ ............................................. C07C 51/00
(52) U.S. Cl. .................................. 554/163; 252/182.13
(58) Field of Search ...................... 554/163; 252/182.13

*Primary Examiner*—Deborah D. Carr
(74) *Attorney, Agent, or Firm*—Lathrop & Gage L.C.

(57) ABSTRACT

The present invention relates to a method for solubilizing polystyrene in a fatty acid ester, whereby the resultant polystyrene fatty acid ester composition can be used in a variety of polymeric applications, including forming an improved polyester. The present invention also relates to the resultant polystyrene fatty acid ester composition.

9 Claims, 1 Drawing Sheet

FATTY ACID ESTERS TO DISSOLVE POLYSTYRENE FOR PRODUCTION OF COMMODITY MATERIAL USEFUL FOR PRODUCTION OF POLYMERS

FIELD OF INVENTION

The present invention relates to a method for solubilizing polystyrene constituents in a fatty acid ester. The solubilized polystyrene fatty acid ester mixture can be used in a variety of polymeric applications including forming low cost mixed polymers.

BACKGROUND OF INVENTION

Polystyrenes $(C_6H_5CHCH_2)_n$, which are also known as styrofoam, are transparent, hard, high strength and impact resistant polymers which are often used in electrical, vibrational, and thermal insulator applications. Additionally, polystyrenes are used in applications related to packaging, refrigerator doors, air conditioner cases, containers and molded household wares, boats, water coolers, and a variety of other uses. As can be seen, use of polystyrene is prevalent. Despite the prevalence of polystyrene, there are disadvantages associated with its use. Polystyrene does not readily degrade and typically cannot be reused. Consequently, waste polystyrene is typically disposed of in landfills as a solid waste. This is an undesired way of disposing of waste polystyrene, especially in view of a more environmentally conscious public. Polystyrene is a low density, high volume material, causing it to consume space in a landfill. As such, there is a desire to reduce the amount of polystyrene material placed in landfills, with it especially desired to have a method for reusing or recycling polystyrene. Because of their low density and high volume, polystyrenes are a special problem in landfills.

Previously, one method for reusing or disposing of waste polystyrenes involved dissolving such constituents in volatile organic compounds (VOCs). The VOC is any hydrocarbon, except methane and ethane, with a vapor pressure equal or greater than 0.1 mm Hg. After dissolution, the VOC and polystyrene mixture was then used as a constituent in finished polymeric products. Unfortunately, methods for disposing of polystyrenes which include VOCs are undesirable because such constituents are typically hazardous and present a variety of additional waste disposal problems. As such, it is desired to have a method for solublizing and reusing polystyrene that does not involve the use of a VOC or similar hazardous material. More particularly, it is desired to have a method or composition which can be used to solubilize polystyrene that is not hazardous and can be readily used in a variety of applications.

SUMMARY OF INVENTION

The present invention relates to a method for solubilizing polystyrene, wherein the method involves placing polystyrene in an amount of a liquid fatty acid ester, with the fatty acid ester preferably heated. The fatty acid ester will cause the polystyrene to liquify and form a polystyrene fatty acid ester mixture. If the fatty acid ester is heated, the polystyrene will liquify faster. The present invention also relates to the polystyrene fatty acid ester composition that can be mixed with a polyester to form an improved polymeric composition.

As alluded to above, the present method includes heating the fatty acid ester to a temperature sufficient to cause the polystyrene to rapidly solubilize in the heated fatty acid ester. Solubilization can occur at ambient temperatures but at a slower rate. Also, temperatures can vary dependent upon the conditions associated with the step of heating the fatty acid ester. Such conditions include the pressure and whether the mixture is stirred.

The fatty acid ester can be selected from any of a variety of fatty acids that have been esterified. It is preferred, however, if the fatty acid portion of the fatty acid ester is a long chain fatty acid. Any fatty acid ester can be used so long as the polystyrene can be solubilized in the oil and the resultant mixture can be used in various polymeric applications. It is preferred if the polystyrene is added to the oil in an amount equal to between 1% and 80% by weight of the fatty acid ester. Also, it is most preferred if the fatty acid ester is a methyl soyate.

The present invention is advantageous for a number of reasons. Most importantly, the present invention is an environmentally friendly method for reusing polystyrene. Further, the present invention is advantageous because a method is developed that allows for reuse of the polystyrene, whereby disposal in a landfill is substantially eliminated. Another advantage related to the polystyrene fatty acid ester composition includes mixing with a polyester to form an improved polymeric composition.

DETAILED DESCRIPTION OF INVENTION

Figure 1:
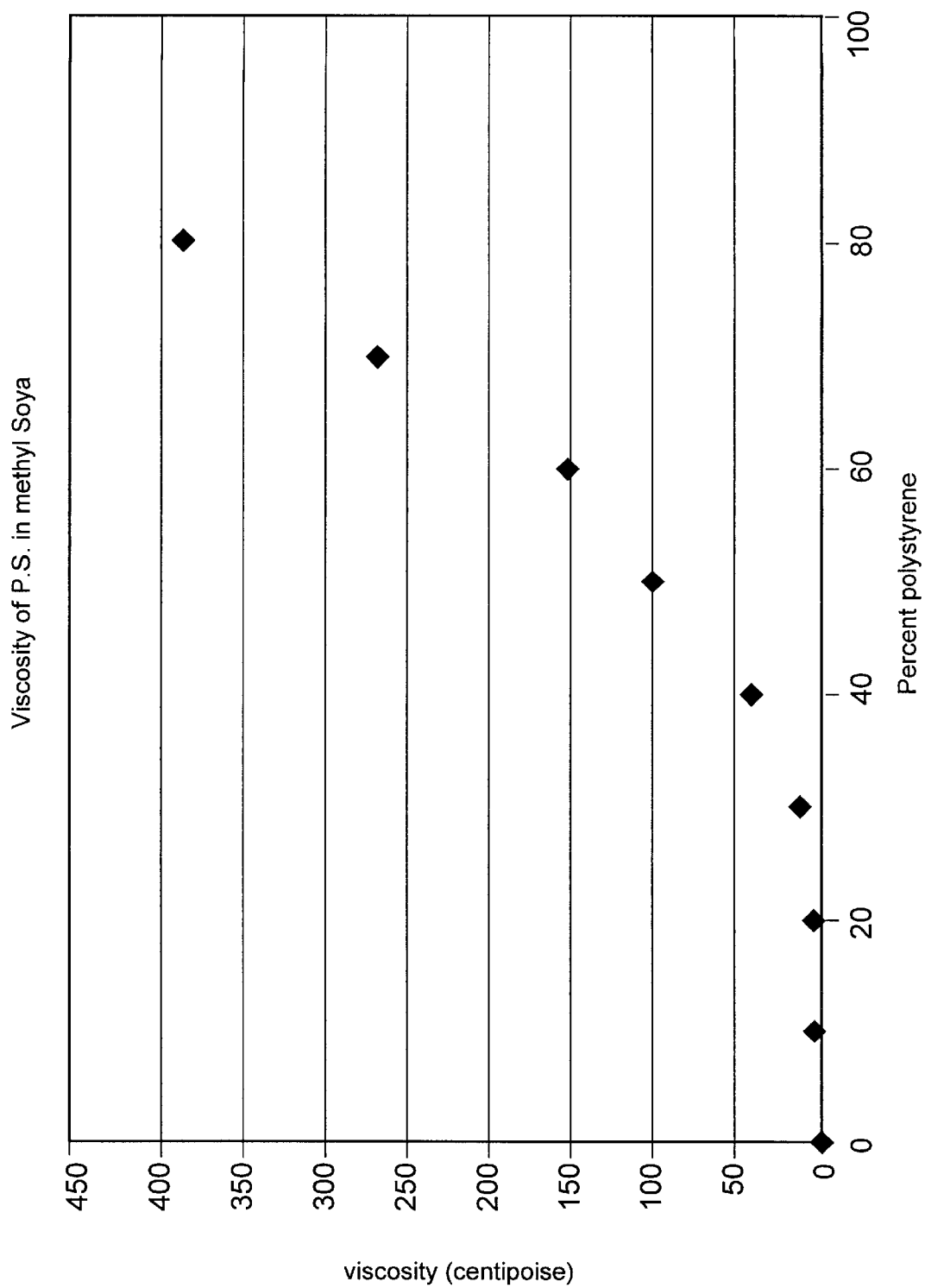
FIG. 1 shows the viscosity of the fatty acid ester polystyrene composition, with varying amounts of polystyrene.

The present invention relates to a method for use in disposing of polystyrene, preferably waste or discarded polystyrene, whereby the polystyrene is solubilized in a fatty acid ester. More particularly, the present invention relates to a method for recycling polystyrene. The present invention also relates to the resulting polystyrene fatty acid ester composition or mixture which can be used in a variety of applications, including use in forming an improved polymeric composition.

The method is initiated by obtaining an amount of a liquified fatty acid ester. Preferably, the fatty acid ester is heated to a temperature equal to at least 20° C. and preferably the fatty acid ester is heated to 100° C. Typically, the fatty acid ester will be heated to a temperature ranging between 100° C. and 180° C. Other temperatures may be used so long as the polystyrene can be solubilized in the fatty acid ester and an adverse reaction does not result as a consequence of an elevated temperature. In particular, it is important to ensure that ignition of the fatty acid ester does not occur. During heating of the fatty acid ester the pressure will generally be held at ambient conditions. The fatty acid ester can be heated in a flask or similar device, with the size of the vessel dependent upon the amount of final product desired. If necessary the fatty acid ester can be heated in a mixing tank or similar large volume device using automated equipment for heating, feeding, and dissolving.

The fatty acid ester can be comprised of any of a variety of alkyl and alkene esters attached to fatty acid chains. The fatty acid chains will generally be chains equal to 15 carbons (C-15) or longer, with C-18 chains most preferred. Among the specific fatty acids that can be used are palmitic, stearic, oleic, linoleic, and linolenic, as well as combinations thereof. It is preferred if the ester is a methyl ester, however, ethyl esters and allyl esters may be used as well as other types of saturated and unsaturated alcohols. Preferably, the fatty acid ester has a formula as follows:

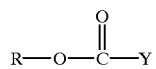

R equals $CH_3$, $C_2H_5$, $CH_2=CHCH_2$, saturated alcohols, and unsaturated alcohols. Y equals palmitic $(CH_2)_{14}CH_3$, Stearic $(CH_2)_{16}CH_3$, Oleic $(CH_2)_7CH=CH(CH_2)_7CH_3$, Linoeic $(CH_2)_7CH=CH-CH_2-CH=CH-(CH_2)_4CH_3$, and Linolenic $(CH_2)_7CH=CH-CH_2-CH=CH-CH_2-CH=CH-CH_2)-CH_3$ fatty acids. The most preferred fatty acid ester is methyl soyate which is a mixture of methyl esters of five predominant fatty acids found in soybean oil.

After the fatty acid ester has reached a sufficient temperature an amount of polystyrene is added thereto. The polystyrene is preferably a waste polystyrene which means it has been used previously in an application and been discarded. Typically, the polystyrene will be in the form of waste packing or insulating material. The polystyrene is added to the fatty acid ester in an amount ranging between 1% and 80% by weight of the fatty acid ester. More preferably, the polystyrene is added in an amount equal to between 10% and 80% by weight of the fatty acid ester. How much polystyrene is added is dependent upon what the resultant composition will be used for. As the amount of polystyrene added is increased the corresponding viscosity of the resulting composition will increase. Typically, an addition of an amount of polystyrene equal to 10% by weight will equal a viscosity of about 1 centipoise (cps). The viscosity is determined by assuring the fatty acid ester has a viscosity of $0_4$ Cps. An amount of polystyrene equal to about 80% by weight of the fatty acid ester will result in a material with a viscosity equal to about 400 cps. The viscosity to polystyrene ratio is illustrated in FIG. 1.

The time to dissolve the polystyrene in the fatty acid ester is dependent on the temperature. Dissolution time is negligible at temperatures above approximately 150° C., with 10% dissolving or solubilizing in approximately 10 seconds. As more polystyrene is added the time to solubilize the polystyrene is increased. The polystyrene and fatty acid ester mixture can be stirred to cause the polystyrene to solubilize faster.

The resulting polystyrene fatty acid ester composition will have a temperature ranging between 100° C. and 180° C. Also, the composition will be a liquid and have a viscosity ranging between about 1 cps and about 400 cps.

Any of a variety of methods can be used to dissolve the polystyrene in the fatty acid ester. A large mixing tank can be used or an automated process may be used. Regardless of the vessel or method, it is important that the polystyrene dissolves.

The polystyrene fatty acid ester composition can be mixed with an amount of polyester resin to form an improved polymeric composition or mixture. The polyester resin and polystyrene can be mixed together in varied ratios. Preferred ratios are 1:1 or 1:2 ratio, with the ratios determined on a weight basis. The polyester resin is liquid like the polystyrene fatty acid ester composition. Once mixed a reaction initiator is added to the mixture, with the mixture then cured at a temperature ranging between 25° C. and 100° C. The polyester polystyrene fatty acid ester mixture is well suited for use in fiber reinforced composites or as a water resistant coating.

In the alternative the polystyrene fatty acid ester composition can be used alone in applications that do not involve mixing with a polyester. The method of curing is similar to curing the polyester and polystyrene fatty acid ester mixture. The resulting products include coatings, films, and termiiticide carriers.

The present Examples are for illustrative purposes only and are not meant to limit the claims in any way.

EXAMPLES

Example 1

An amount of polystyrene was solubilized so that the polystyrene could be reused instead of disposing of such product in a landfill.

To a beaker approximately 500 milliliters (ml) of soya esters were added. The beaker was located on a hot plate and the soya ester was then heated to a temperature equal to 100° C. The temperature of the oil was monitored using an immersible thermometer. Once a sufficient temperature was reached pieces of polystyrene were dropped into the heated oil. Approximately 42 grams of polystyrene was added to the oil. This was equal to approximately 10% by weight of the oil. The polystyrene dissolved in approximately 10 seconds.

A polystyrene fatty acid ester composition was formed which was well suited for use with an amount of polyester or which could be cured to form products.

Example 2

To a beaker approximately 500 milliliters (ml) of soya esters were added. The beaker was on a hot plate and the soya ester was heated to a temperature equal to 100° C. The temperature of the oil was monitored using an immersible thermometer. Once a sufficient temperature was reached pieces of polystyrene were dropped into the heated oil. As the polystyrene was dropped into the oil and solubilized the viscosity was measured. The viscosity was measured by using a Ferranti-Shirley cone and plate viscometer. The spring of the viscosity meter was compressed to 650 dyne for all measurements while rotational speeds varied from 0–100 rpm. The viscosity of neat methyl soyate (without polystyrene) was determined at 29.9° C. using a 60 second sweep with a 7 cm cone.

Viscosities of mixtures containing 10–80% by weight of polystyrene were determined at 28.4° C. using a 20-second sweep with 7, 4, or 2 cm cones as indicated below.

| % By Weight Polystyrene | Cone Size |
|---|---|
| 10% | 7 cm |
| 20% | 4 cm |
| 30% | 4 cm |
| 40–80% | 2 cm |

The viscosities of the polystyrene fatty acid ester mixture were as follows:

| % Polystyrene | Visc. Centipoise |
|---|---|
| 0 | 0.0664 |
| 10 | 1.15 |

-continued

| % Polystyrene | Visc. Centipoise |
| --- | --- |
| 20 | 3.45 |
| 30 | 16 |
| 40 | 40 |
| 50 | 100 |
| 60 | 150 |
| 70 | 260 |
| 80 | 390 |

This data shows the viscosity of the composition as the polystyrene is added. The viscosity results were also charted in FIG. 1. As can be seen, viscosity increases as the amount of polystyrene added is increased.

Thus, there has been shown and described a method for solublizing polystyrene constituents in a fatty acid ester, which fulfills all of the objects and advantages sought therefor. It will be apparent to those skilled in the art, however, that many changes, variations, modifications, and other uses and applications for the subject product are possible, and also changes, variations, modifications, and other uses and applications which do not depart from the spirit and scope of the invention are deemed to be covered by the invention which is limited only by the claims which follow.

What is claimed is:

1. A method for solubilizing polystyrene in a fatty acid ester to form a polystyrene fatty acid ester mixture, whereby said polystyrene fatty acid ester mixture can be used in a variety of applications including mixing said polystyrene fatty acid ester mixture with an amount of polyester to form an improved polyester product, wherein said method comprises:
   (a) obtaining an amount of said fatty acid ester having a temperature equal to at least 20° C.; and,
   (b) adding an amount of polystyrene to said heated fatty acid ester, with said polystyrene added in an amount equal to between 1% and 80% by weight of said fatty acid ester to cause said polystyrene to solubilize into said fatty acid ester thereby forming said polystyrene fatty acid ester mixture.

2. The method of claim 1, wherein said polystyrene fatty acid ester mixture has a viscosity ranging between 1 centipoise and 400 centipoise.

3. The method of claim 1, wherein said fatty acid ester is heated to a temperature ranging between 100° C. and 180° C.

4. The method of claim 1, wherein said fatty acid ester is a methyl soyate.

5. The method of claim 1, wherein esters that comprise said fatty acid ester are selected from the group consisting of alkyl and alkaline esters.

6. The method of claim 1, wherein said polystyrene is added in an amount equal to between 10% and 80% by weight of said fat acid ester.

7. The method of claim 5, wherein esters that comprise said fatty acid ester are selected from the group consisting of methyl, ethyl, and allyl esters.

8. The method of claim 1, wherein fatty acids that comprise said fatty acid ester are selected from the group consisting of Y equaling palmitic $(CH_2)_{14}CH_3$, Stearic $(CH_2)_{16}CH_3$, Oleic $(CH_2)_7CH=CH(CH_2)_7CH_3$, Linoleic $(CH_2)_7CH=CH-CH=CH(CH_2)_4CH_3$, and Linolenic $(CH_2)_7CH=CH-CH_2-CH=CH-CH_2-CH=CH-CH_2-CH_3$ fatty acids.

9. A polystyrene fatty acid ester composition, wherein said composition comprises an amount of a fatty acid ester and an amount of a polystyrene, with said polystyrene equal to between 1% and 80% by weight of said fatty acid ester, with said polystyrene fatty acid ester composition having a viscosity ranging between 1 and 400 centipoise and a temperature ranging between 20° C. and 180° C.

\* \* \* \* \*